United States Patent [19]

Wallace

[11] 4,058,357

[45] Nov. 15, 1977

[54] MAGNETIC RADIO MOUNTING BRACKET

[76] Inventor: Dewey K. Wallace, 812 Wateka, Richardson, Tex. 75209

[21] Appl. No.: 725,796

[22] Filed: Sept. 23, 1976

Related U.S. Application Data

[63] Continuation-in-part of Ser. No. 672,186, March 31, 1976.

[51] Int. Cl.$^2$ ............................................. H01R 11/30
[52] U.S. Cl. ............................ 339/12 R; 211/DIG. 1; 248/206 A
[58] Field of Search .................... 339/12 R, 12 G, 10; 248/206 A, 206 R, 208, 205 R; 211/DIG. 1

[56] References Cited

U.S. PATENT DOCUMENTS

| | | | |
|---|---|---|---|
| 3,126,190 | 3/1964 | Miller | 248/206 A |
| 3,706,882 | 12/1972 | Eby | 339/10 |

Primary Examiner—Roy Lake
Assistant Examiner—DeWalden W. Jones
Attorney, Agent, or Firm—Howard E. Moore; Gerald G. Crutsinger; Larry B. Dwight

[57] ABSTRACT

A detachable radio mount for a vehicle comprising a dash bracket bolted or otherwise secured to the dash of a vehicle and a radio bracket bolted or otherwise secured to a radio or other communication device. Bar magnets are secured in ferrous metal brackets which are secured to the dash bracket such that a magnetic circuit is formed from the north to the south pole of the magnets increasing the magnetic flux of the magnet in the area surrounding the magnet. Ferrous metal plates having a width equal to the width of the ferrous metal brackets on the dash bracket and being approximately two times the thickness of the ferrous metal brackets are secured to the radio bracket by adhesive or other means such that magnetic force pulls the ferrous metal plates toward the bar magnets and ferrous metal brackets. A magnetic bond is formed between the magnets and the ferrous metal plates having sufficient strength to hold a radio and which may be separated therefrom by pressing downward on either side or, sliding the steel plates longitudinally relative to the bar magnets. Electrical connections are provided through the ferrous metal bracket on the dash bracket and the metal plates on the radio bracket since ferrous metal is a conductor of electricity. A second embodiment has guides formed between the metal plates which when connected to the dash bracket extend between the metal brackets to shield adjacent brackets from the RF cross-over.

12 Claims, 10 Drawing Figures

MAGNETIC RADIO MOUNTING BRACKET

CROSS-REFERENCE TO RELATED APPLICATIONS

This application is a continuation-in-part of my application, Ser. No. 672,186, filed Mar. 31, 1976 entitled "Magnetic Radio Mounting Bracket."

BACKGROUND OF THE INVENTION

Today's mobile society has brought about an increased popularity of more sophicated communication devices such as CB radios, tape decks, AM-FM stereo radios and other communication devices. Along with the popularity of these devices an increase in theft of these devices has developed due to the ease of removal and sale of the devices. One way to reduce the likelihood of theft of the devices from a vehicle is to provide a removable mounting bracket so that the device may be taken with the owner or placed in an inaccessible place such as the trunk of the automobile.

Removable brackets heretofore have been of the mechanical type which have electrical contacts having very small area dimensions. One problem with these mechanical devices is that vibration in the automobile will often momentarily break the contact between the dash bracket and the radio bracket which on some devices may cause substantial damage to the device, such as on a CB radio. Mechanical type brackets don't have the proper impedance to match the antenna and radio and consequently can cause damage to the radio.

SUMMARY

I have devised a magnetic mounting bracket for radios or other electronic devices which comprises a dash bracket having bar magnets secured in a C-shaped ferrous metal channel to increase the magnetic flux of the bar magnet and a radio bracket having ferrous metal plates aligned and adapted to engage the C-shaped ferrous metal bracket. The radio bracket is secured to the top of the radio or other communication device and the dash bracket is secured to the underside of the dash or other suitable object in a vehicle.

The electrical connections on the dash bracket are secured to each C-shaped metal bracket which will conduct electricity such that when the plates on the radio bracket engage the C-shaped bracket an electrical circuit is made through the C-shaped brackets and the plates on the radio bracket to the radio.

A second embodiment of the radio bracket has guides formed between the ferrous metal plates which extend outwardly beyond the plates and engage slots formed by the edges of the C-shaped metal brackets on the dash portion of the bracket. These guides form a shield between adjacent C-shaped metal brackets to prevent RF gain cross-over. In addition, the brackets and plates may be divided in half by a small partition such that six contact points are formed between the magnets and plates, allowing use of the bracket on devices such as 8-track tape units or FM stereo radios.

A primary object of the invention is to provide a detachable radio mounting bracket which will not vibrate loose when the vehicle is in motion to prevent damage from occurring to the electronic communication device attached thereto.

A further object of the invention is to provide a magnetic radio holding bracket which cannot be separated by pulling the radio bracket from the dash bracket such that the brackets can only be separated by sliding the radio bracket relative to the longitudinal axis of the bar magnets, or pressing downward on either side of mounted radio.

A further object of the invention is to provide a radio mounting bracket which is removable such that the electronic communication device may be placed in a more secure position to prevent theft of the device.

A still further object of the invention is to provide a device in which the electric connections between the dash on the radio are achieved by the strong bond of the magnet such that the contact points cannot be separated which might damage or cause malfunctioning of the electronic communications device.

Other and further objects of the invention will become apparent upon a detailed study of the description following and by referring to the drawings annexed hereto.

DESCRIPTION OF THE DRAWINGS

Drawings of the preferred embodiments of the invention are annexed hereto so that the invention may be more fully understood, in which.

Numeral references are used to designate the parts shown in the drawings and like numerals designate like parts throughout the various FIGURES of the drawings.

DESCRIPTION OF A PREFERRED EMBODIMENT

Figure 1:
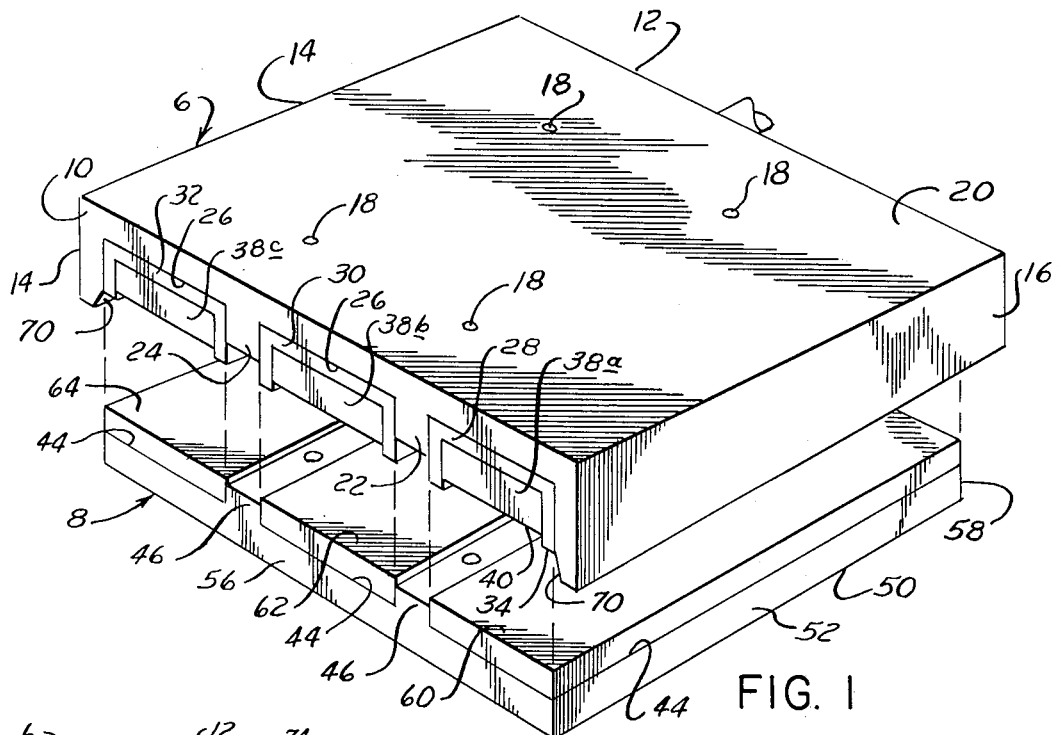
FIG. 1 is a frontal perspective exploded view of the dash bracket and radio bracket.

Referring to FIG. 1 of the drawing, the numeral 6 designates a dash bracket which is bolted or otherwise secured to a dash in a vehicle (not shown). A radio bracket 8 is aligned with the dash bracket 6 and may be bolted or otherwise secured to a communication device such as a CB radio, tape deck, FM stereo radio or other listening devices indicated by the numeral 7.

The dash bracket 6 and radio bracket 8 are constructed of non-ferrous, non-electrically conductive material such as bakelite, polyvinyl chloride plastics, or ABS (acrylonitrile-Butadiene-styrene).

The dash bracket 6 has a front side 10 and a rear side 12 connected by sides 14 and 16 which extend downwardly. Rear side 12 extends downwardly to limit movement of radio bracket 8 to rear side 12.

Holes 18 are preferably formed in the upper side 20 of dash bracket 6 for passage of screws to attach the dash bracket 6 to a vehicle (not shown).

Partitions 22 and 24 form channels 26 on the lower edge of dash bracket 6.

Figures 2, 3:
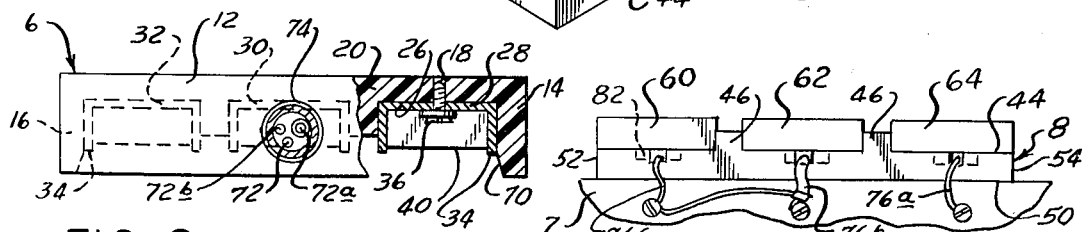
FIG. 2 is a rear elevational view of the dash bracket with parts broken away to more fully illustrate the details of construction.
FIG. 3 is a rear elevational view of the radio bracket.
Figure 4:
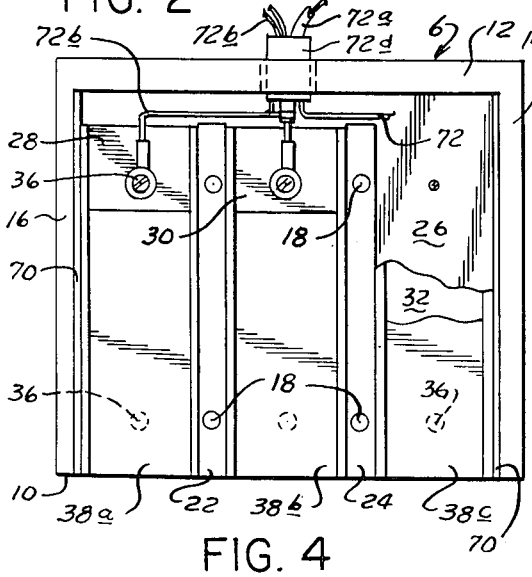
FIG. 4 is a bottom plan view of the dash bracket with parts broken away to more clearly illustrate the details of construction.
Figure 5:
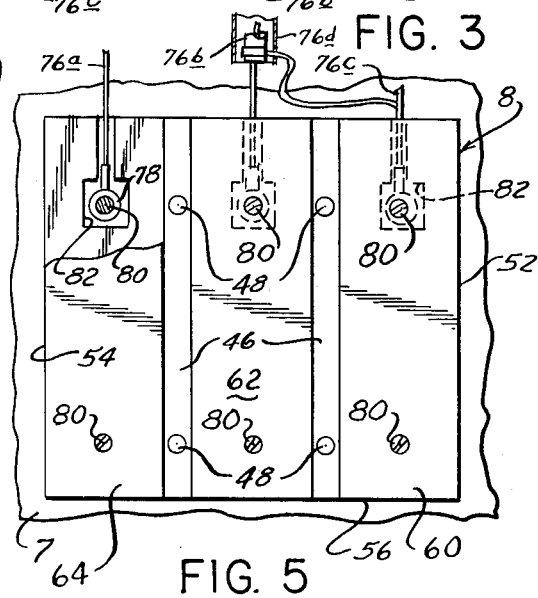
FIG. 5 is a top plan view of the radio bracket with parts broken away to more clearly illustrate the details of construction.

As most clearly illustrated in FIGS. 1, 2 and 4, ferrous metal channels 28, 30 and 32 are secured by fasteners 36, or by adhesives, in channels 26 to bracket 6 between partitions 22 and 24 and sides 14 and 16 of dash bracket 6. The C-shaped channels 28-32 have edges 34 which extend downwardly.

Magnet means such as bar magnets 38a, 38b, and 38c are secured in channels 28, 30, and 32 by adhesive or the like and are constructed such that the exposed lower edge 40 of each magnet does not extend to the edges 34 of C-shaped ferrous metal channels 28, 30 and 32 thus forming channels therebetween to receive bars 60, 62 and 64.

It should be readily apparent that each of the permanent bar magnets has a north pole and a south pole in which magnetic flux or a magnetic field flows from the north pole to the south pole forming a magnetic circuit. If iron or other ferrous metal is provided to connect the north pole with the south pole, the magnetic flow in the magnetic circuit is increased and the magnetic flux or density of the magnet is increased thus increasing the power of the magnet.

It should be readily apparent that the C-shaped metal channels 28, 30 and 32 form a path from the north to the south pole of magnets 38a, 38b, and 38c forming a magnetic circuit which increases the pull of the magnets and also magnetizes the C-shaped ferrous metal brackets 28, 30 and 32.

The radio bracket 8 has channels 44 formed therein with partitions 46 formed therebetween. The radio bracket 8 may be secured by screws through passages 48 or self-sticking adhesives strips (now shown) attached to the lower side 50 of bracket 8. Bracket 8 has sides 52 and 52 spaced from ends 56 and 58.

Magnetically attracting means such as ferrous metal plates 60, 62 and 64 are secured in channels 44 of radio bracket 8 by adhesive, screws or the like. As viewed in FIGS. 2 and 3, the thickness of the metal plates 60-64 is approximately twice the thickness of edges 34 of C-shaped metal channels 28, 30 and 32. In addition, the width of ferrous metal plates 60, 62 and 64 is preferably equal to the width of C-shaped channels 28, 30 and 32 to provide optimum magnetic connection between the dash bracket 6 and radio bracket 8.

It should be readily apparent that sides 52 and 54 are slideably disposed within sides 14 and 16 of dash bracket 6 which is provided with bevelled edges 70 to facilitate alignment of the lower radio bracket with the upper dash bracket. In addition, it should be readily apparent that the partitions 22, 24 and 46 of the dash bracket 6 and radio bracket 8 are constructed such that the respective partitions do not engage each other. However, partitions 46 may extend outwardly (not shown) from plates 60-64 to slide between channels 38a-38b and 38b-38c.

Suitable electrical ground and antenna connections are secured between the vehicle (not shown) and the dash bracket 6 by securing power wire 72, ground wire 72b and coaxial antenna cable 72a, as best illustrated in FIGS. 2 and 4, through a passage 74 in bracket 6 and securing them to screws 36 on the rear side 12 of dash bracket 6 by clips 76. It should be readily apparent that suitable electrical connections would be dependent upon the type of electronic communication device installed; for example, a CB radio would require grounded coaxial shielded cable 72a for an antenna to channel 30, a 12 volt DC power line 72 to channel 32 and a ground connection 72b to channel 28.

Suitable electrical and antenna connections are made through power line 76a, ground cable 76c, and coaxial antenna cable 76b and clips 78 to plates 60, 62 and 64 through fasteners 80. Recesses 82 are formed between the plates and the channels 44 of lower radio bracket 8 to provide a flat surface for the plates to pass over. Lines 76a are connected to communications device 7 by suitable connectors, giving a 12 volt source to plate 64 ground connection to plate 60 and antenna connection to plate 62. The antenna preferably has a coaxial type plug secured thereto for conventional hookup.

A suitable panel type receptacle coaxial connector (not shown) may be attached to the rear wall 12 of bracket 6 such that it extends outwardly from wall 12 for direct connection to the antenna lead in.

Operation of the hereinbefore described device is as follows:

The dash bracket 6 is attached by means of screws or other attachment means through passages 18 to the vehicle. The radio bracket 8 is attached by screws or other fastening means through passages 48 or by a self-adhesive tape to the top of the radio 7. The electrical connections are made to the antenna, the power source, and ground or other suitable electrical connections necessary through power wire 72, ground wire 72b and coaxial cable 72a. The radio or other communication device with the radio bracket 8 attached thereto is then hand lifted toward dash bracket 6 until edges 52 and 54 of the lower radio bracket 8 is aligned by bevelled edges 70 such that plates 60, 62 and 64 engage C-shaped metal channels 28, 30 and 32 on dash bracket 6, thus securing the lower radio bracket 8 to the upper dash bracket 6 by magnetic attraction. Thus, power is supplied to the transceiver through power wire 72, channel 32, magnet 38c, plate 64, and wire 76a; ground connection is made through ground wire 72b, channel 28, magnet 38a, plate 64 and ground wire 76a, and radio signals are transmitted through coaxial cable 72a, channel 30, magnet 38b, plate 62 and coaxial cable 76b, all of which may be encased in shielded cables 72d and 76d. The cable 72d communicates with the antenna and power source and ground on the vehicle while cable 76d is plugged into the transceiver 7 by suitable connections.

To remove the radio 7 and lower bracket 8, the lower bracket 8 is moved in a longitudinal direction relative to the longitudinal axis of the bar magnets 38 such that plates 60, 62 and 64 slide along edges 34 of C-shaped brackets 28, 30 and 32 thus removing the radio. An alternate method of removal is to grasp one side of the radio 7 and pull downwardly.

It should readily be appreciated that all electrical connection, i.e., antenna, power, ground, and speakers are made through the magnetic connectors assuring constant electrical connections without external connections to the transceiver or other electronic device.

MODIFIED FORM

FIGS. 6-10 illustrate a modified form of the dash bracket 6' and radio bracket 8'. This form of the bracket divides the C-shaped channels and plates in half to form two or more rows of channels and plates providing more contact points for electrical connections between a device such as an 8-track tape player or FM stereo radio and a vehicle.

The dash bracket 6' has front side 10', rear 12', and sides 14' and 16'. Partitions 22' and 24' are formed on the under edge of dash bracket 6'. A partition 23' is formed transversely between sidewalls 14' and 16' dividing the area between the sidewall 14' and 16' into two sections. Partition 23' preferably extends about 1/16th of an inch outwardly from the surface of the channels to prevent engagement of the plates until the brackets 6' and 8' are properly aligned. Ferrous metal C-shaped channels 26a', 26b', 28a', 28b', 30a', 30b' are positioned on each side of partition 23' between partitions 22' and 24' and sidewalls 14' and 16'.

Magnetic means such as bar magnets 91–96 are positioned in each of the C-shaped channels 26a', 26b', 28a', 28b', 30a', and 30b'.

Figures 6, 7:
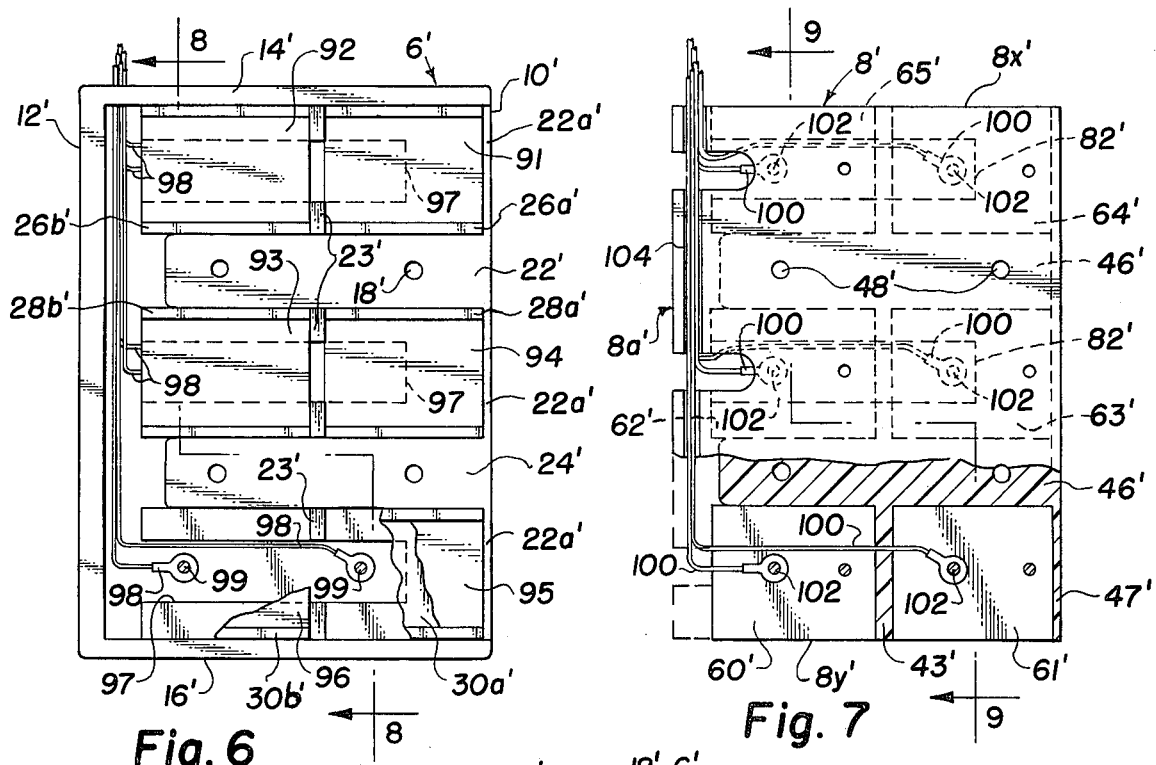
FIG. 6 is a bottom plan view of a modified form of the dash bracket with parts broken away to more clearly illustrate the details of construction.
FIG. 7 is a bottom plan view of the modified form of the radio bracket with parts broken away to more clearly illustrate the details of construction.
Figure 8:
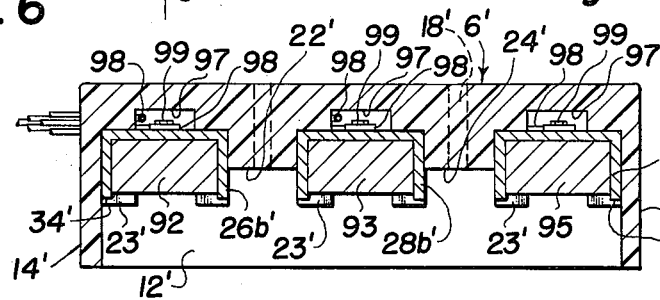
FIG. 8 is a cross-section view taken along line 8—8 of FIG. 6.

As best illustrated in FIGS. 6 and 8, recesses 97 are formed adjacent the web of C-shaped channels between the bracket 6' and channels 26a'–30b'. Recesses 97 provide a space for connecting wires to the channels 26a'λ –30b'. Electrical conduits 98 are connected by fasteners 99 to each of the C-shaped metal brackets 26a', 26b', 28a', 28b', 30a' and 30b' providing six electrical connections in the illustrated embodiment.

Figure 9:
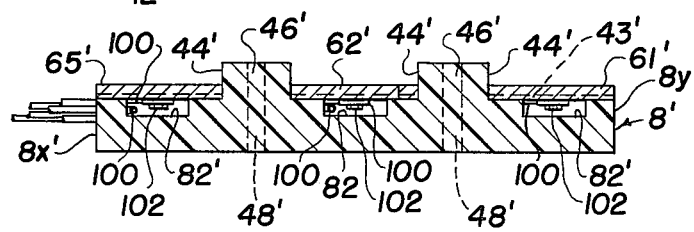
FIG. 9 is a cross-sectional view taken along line 9—9 of FIG. 7 with parts broken away to more clearly illustrate the details of construction.
Figure 10:
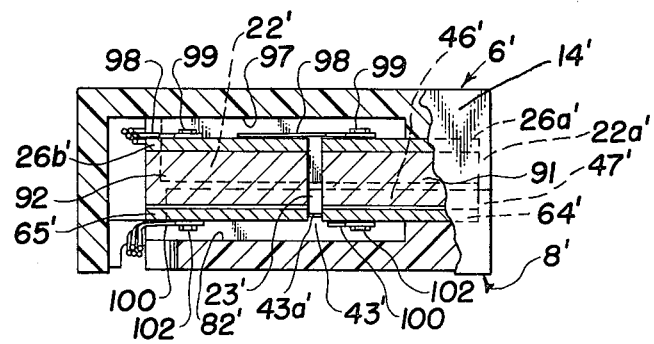
FIG. 10 is a side elevational view of the dash and radio brackets joined together with parts broken away to more clearly illustrate the details of construction.

As best illustrated in FIGS. 7 and 9, the radio bracket 8' comprises a rectangular shaped bracket having guide means such as partitions 46' formed therein and extending outwardly from the upper surface of the bracket 8' to engage slots formed between the channels 26a'–30b' on bracket 6'. Bracket 8' has grooves 44' formed on the upper surface thereof to accept magnetically attracting means such as ferrous metal plates 60', 61', 62', 63', 64', and 65' having a thickness approximately twice the thickness of the edges 34' of the C-shaped channels 91–96. Recesses 82' are formed in channels 44' under the plates 60'–65'. A partition 43' is formed between plates 60' and 61', 62' and 63', and 64' and 65' and is spaced from the upper surface to form a slot 43a' to receive partition 23'.

It should be readily apparent that partition 23' prevents the plates from contacting more than one channel when inserting the radio bracket 8'. The extending partition 23' moves over the plates until the partition 23' is aligned with groove 43'. This prevents an electrical short between the contacts.

As best illustrated in FIG. 7, electrical conduits 100 are connected by fasteners 102 to each plate 60'–65' providing six conduits. A channel 104 is formed along the rear edge 8a' of bracket 8' for positioning the conduits 100.

As best illustrated in FIG. 9, the upper surface of partitions 46' extends outwardly from plates 60'–65' and are adapted to slide within the slot or channel 26' formed between the edges 34' of C-shaped metal brackets 26a'–30b'. The partitions 46' serve to guide the radio bracket 8' into the proper position on the dash bracket 6'. In addition the guides form an RF gain shield between the respective electrical connections on the C-shaped channel members 28a'–30b' to prevent signal cross-over.

It should readily be apparent that C-shaped metal channel 26a' mates with plate 64', channel 26b' mates with plate 65', channel 28a' mates with plates 63', channel 28b' mates with plate 62', channel 38' mates with plate 61' and channel 30b' mates with plate 60'. This provides six electrical contacts between the C-shaped channels 26a'–30b' and magnets 91–96 to the plates 60'–65' on the radio bracket. As previously described, various electrical connections may be made through these but this embodiment of the invention is particularly adaptable for a multi-channeled tape deck or radio. For example, a quadraphonic tape deck having four channels may be connected to four separate sets of speakers and connections are available for power and ground.

An example of electrical connections would be connecting 12 volts DC to channel 26a' and plate 64' and ground connected to channel 26b' and plate 65. Speakers or other connections may be made through the remaining channels 28a'–30b' and plates 60'–63'. Other arrangements could be devised depending on the device to be connected.

It should be readily apparent that the guides 46' may be provided on the first preferred embodiment of the invention to guide the radio bracket 8' into the dash bracket 6'.

It should be readily apparent that other configurations and divisions of the magnets may be devised which would provide multiple electrical contacts through the magnetic connections provided by the magnet C-shaped channels and plates.

From the foregoing it should be readily apparent that each of the embodiments hereinbefore described accomplishes the objects of the invention hereinbefore discussed.

I claim:

1. Means for detachably mounting an electronic device in a vehicle comprising: a first bracket attachable to a dash on the vehicle; a channel composed of a ferrous type metal; means to secure the channel to the first bracket; a bar magnet secured in the channel; a second bracket attachable to an electronic device; a ferrous metal plate; a means to secure the plate to the second bracket, the plate being adapted to engage the channel and the bar magnet on the first bracket; electrical connector means connected to the channels on said first bracket; electrical connector means connected to the ferrous metal plate; and guide means on the second bracket adapted to slideably engage a slot formed adjacent the channel on the first bracket.

2. The combination called for in claim 1 wherein the channel comprises: a substantially C-shaped channel.

3. The combination called for in claim 1 wherein a plurality of channels are secured to the first bracket; a plurality of bar magnets are secured in the channels; and a plurality of plates corresponding to the magnets are attached to the second bracket.

4. The combination called for in claim 3 wherein the channels are arranged on the first bracket in rows; a partition formed between the rows of channels; and the plates on the second bracket are arranged in rows such that the plates are aligned with the channels when the first and second brackets are engaged.

5. The combination called for in claim 1 wherein the thickness of said metal plates on said second bracket is substantially twice the thickness of the C-shaped metal channels.

6. In a device for detachably, electrically connecting first and second devices together; a first support; at least one magnet attached to the first support; a second support, at least one magnetically attracting member attached to the second support; electrical supply means attached to a suport vehicle and electrically connected to the first support; electrical connection means attached to the second support and electrically connected to magnetically attracting member; and guide means formed on the second support adapted to engage a slot formed on the first support to align the magnet and magnetically attracting member.

7. The combination called for in claim 6 wherein the magnet is recessed in a channel in the first support and the magnetically attracting member extends outwardly of the second support and is arranged to be slideably received on the channel.

8. The combination called for in claim 6 wherein there are a plurality of magnets mounted on the first support; and a plurality of corresponding magneticlly attracting members on the second support.

9. Means for detachably and electrically connecting an electronic device in a vehicle comprising; a first support arranged for attachment to the vehicle; a second support member arranged for attachment to an electronic device; magnetic means attached to the first support; magnetically attracting means attached to the second support arranged to contact the magnetic means to detachably attach the first and second support members together; electrical connection means attached to the magnetic means and arranged for attachment to the electrical system in the vehicle; electrical connection means attached to the magnetically attracting means and arranged for attachment to the electrical supply means in the electronic device; and guide means formed on the second support member arranged to engage a slot formed on the first support to align the magnet and magnetically attracting means.

10. The combination called for in claim 9 wherein the magnetic means is arranged in rows; and the magnetically attracting means is arranged in corresponding rows to align with the magnetic means when the first and second supports are engaged.

11. The combination called for in claim 10 with the addition of a partition formed between the rows of magnetic means, the partition extending outwardly from the magnetic means to separate the magnetically attracting means from the magnetic means until the partition is aligned with a space between the rows of magnetically attracting members.

12. Means for detachably and electrically connecting an electronic device in a vehicle comprising: a first support arranged for attachment to a vehicle; first, second and third magnetic means attached to the support; power means attached to the first magnetic means; ground means attached to the second magnetic means; antenna signal means attached to the third magnetic means; a second support arranged for attachment to an electronic device; first, second, and third magnetically attracting means attached to the second support; said first, second, and third magnetic means being arranged for attachment to the respective first, second and third magnetically attracting means to provide electrical connection therebetween corresponding to the electrical connection therebetween corresponding to the electrical connections to the first, second, and third magnetic means; first, second, and third electrical connector means connected to the first, second, and third magnetically attracting means, means connecting the first, second, and third connector means to a power supply, ground and antenna signal connections in the electrical device; and guide members formed between the magnetically attracting means and extending outwardly to slide between the magnet means on the first support to align the magnet means and magnetically attracting means.

* * * * *